United States Patent
Day

(10) Patent No.: US 7,127,646 B1
(45) Date of Patent: Oct. 24, 2006

(54) SYSTEM AND METHOD FOR GENERATING REAL TIME ERRORS FOR DEVICE TESTING

(75) Inventor: Brian A. Day, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 1473 days.

(21) Appl. No.: 09/589,930

(22) Filed: Jun. 7, 2000

(51) Int. Cl.
*G06F 11/00* (2006.01)

(52) U.S. Cl. .................................. 714/703
(58) Field of Classification Search ............. 714/703
See application file for complete search history.

(56) References Cited

U.S. PATENT DOCUMENTS

| | | | | |
|---|---|---|---|---|
| 3,401,379 A | * | 9/1968 | Prell et al. | 714/703 |
| 3,465,132 A | * | 9/1969 | Crockett et al. | 714/703 |
| 4,561,095 A | * | 12/1985 | Khan | 714/767 |
| 4,670,876 A | * | 6/1987 | Kirk | 714/703 |
| 5,872,790 A | * | 2/1999 | Dixon | 714/703 |

* cited by examiner

*Primary Examiner*—Joseph D. Torres

(74) *Attorney, Agent, or Firm*—Maginot, Moore & Beck

(57) ABSTRACT

Test circuitry for supporting real-time testing of data exception software may be included on an integrated circuit. The circuitry supports the identification of a data unit or data group other than a next data unit or data group to be transferred in a data sequence and the generation of an erroneous data verification parameter that does not verify the data content of the identified data unit or data group. The identified data unit or group is later transmitted with the erroneous data verification parameter in real-time following the transmission of other data units and/or data groups having valid data verification parameters. In this manner, a data receiver may be tested to verify the detection of a data content error in real-time and the execution of the software or firmware for processing an exception may be verified. Circuitry for implementing the method of the present invention may be included on the substrate of an integrated circuit. Test circuitry to implement the method of the present invention includes a data unit identifier for identifying a data unit or group within an integrated circuit and a data verification parameter generator for generating a data verification parameter that does not correspond to the data content of the identified data unit or group. The parameter generator may generate an erroneous data verification parameter for storage or transfer with the identified data unit or group. Data units may be identified for erroneous data verification parameter generation by data content or position in a data sequence.

12 Claims, 3 Drawing Sheets

SYSTEM AND METHOD FOR GENERATING REAL TIME ERRORS FOR DEVICE TESTING

FIELD OF THE INVENTION

This invention relates generally to methods and systems for testing electronic circuitry and, more particularly, to methods and systems for testing data communication circuitry.

BACKGROUND OF THE INVENTION

Various types of integrated circuits are used in data communication applications. These integrated circuits include serial-to-parallel data converters, parallel-to-serial data converters, buffers, drivers, and stacks, for examples. Stacks are memory devices that store and transmit data in the same or a different order than that in which the data was received. For example, the data first received by a stack may be the first data transmitted (FIFO) or latter received data may be sent out first (LIFO). Almost all integrated circuits that are used in data communication applications receive and transmit data. They may store multiple units of data and they may convert data from one data format to another or they may convert data from one electrical specification to another. Integrated circuits to provide these various communication functions are well known.

The integrity of data becomes an important issue as data move through multiple devices, are converted into different formats or specifications, or are stored in different devices. Various techniques for verifying data units as they move through different devices have been developed. Many of these techniques require the addition of data about the communicated data that may be used to verify the communicated data. For example, parity is a data verification parameter that indicates whether a unit of data, such as a byte or word, contains an even or odd number of logical '1' bits. While parity is typically used to verify the content of a data unit, other techniques may be used to verify data groups, such as messages or streams, which are comprised of data units. Examples of these verification schemes include cyclic redundancy checksums or longitudinal redundancy checksums. These exemplary data verification schemes and equivalents generate data verification parameters based on the data content of data units or groups. These data verification parameters are transferred with the corresponding data units and/or groups used to generate them. A data receiver uses the same technique to generate data parameters based on the data content of the data units or groups that it receives. It then compares the data verification parameters it generates with the ones that it receives. If the generated data verification parameters correspond to the received data verification parameters, a high probability exists that the data units or groups received are the data units or groups that were transferred.

Integrated circuits used in data communication may contain test circuitry that supports the intentional inclusion of erroneous data verification parameters so software or firmware that processes detected data errors at a data receiver may be tested. In this manner, the detection of erroneous data content and the processing that occurs in response to such detection may be confirmed. Typically, test circuitry in an integrated circuit that supports the inclusion of erroneous data parameters uses a global data register that may only be used to statically set a data parameter to an erroneous parameter. For example, a FIFO may transmits a nine (9) bit data word that includes eight (8) bits of data and a one (1) bit data parameter indicative of the parity of the eight bit data word. Test circuitry may include a global register that permits a user to set the parity bit to a fixed data verification parameter for the next data transmission. When the user knows the data content of a data word to be transmitted, the fixed parameter is chosen to be one that erroneously identifies the parity of the data word. When this data word and parity data parameter are received, a data receiver should detect the error and process an exception for the data word. Thus, the global register of the test circuitry supports verification of data exception processing.

One limitation of the test circuitry defined above arises from the timing of the generation of the error condition. To test a data receiver, the data verification parameter is set to an erroneous value for the next data unit to be transferred. As a consequence, only the first data word or group transmitted after the erroneous data parameter is set may be tested at the data receiver. Such testing does not allow a user to predefine the occurrence of a real-time error condition that occurs after the successful transmission of multiple data words or groups that included valid data verification parameters for verification of each word or group.

What is needed is a method for including erroneous data verification parameters with data units or groups that follow in real-time other data units or groups that have valid data verification parameters.

What is needed is a method for identifying a particular data word or group in a sequence of data words or groups for inclusion with an erroneous data verification parameter for real-time testing.

SUMMARY OF THE INVENTION

The above-noted limitations of previously known integrated circuits and communication testing methods implemented by them have been overcome by a system and method operating in accordance with the principles of the present invention. The method of the present invention is comprised of identifying a data unit or data group other than a next data unit or data group to be transferred in a data sequence; and generating an erroneous data verification parameter that does not verify the data content of the identified data unit or data group. The identified data unit or group is later transmitted with the erroneous data verification parameter in real-time following the transmission of other data units and/or data groups having valid data verification parameters. In this manner, a data receiver may be tested to verify the detection of a data content error in real-time and the execution of the software or firmware for processing an exception may be verified.

Circuitry for implementing the method of the present invention may be included on the substrate of an integrated circuit. For example, an integrated circuit used to implement a first-in, first-out (FIFO) memory device may include such test circuitry. By identifying a data byte or word within a data sequence stored in the device, the valid data verification parameter for the byte or word may be altered in real-time. Content of a data unit or a number indicating the position of the data unit in the sequence stored in the device may be used to identify the data unit for which an erroneous data verification parameter may be generated. In response to a signal to the FIFO to transfer a data unit its stored data unit sequence, a data unit within the sequence may be associated with an erroneous data verification parameter. The data receiver may then be monitored to determine whether it detected the erroneous data verification parameter and processed it correctly.

Test circuitry to implement the method of the present invention includes a data unit identifier for identifying a data unit or group within an integrated circuit and a data verification parameter generator for generating a data verification parameter that does not correspond to the data content of the identified data unit or group. The parameter generator may generate an erroneous data verification parameter and store it with the identified data unit or group. Alternatively, the generator may generate the erroneous parameter in real-time during transfer of a sequence of data units or groups and include it in the transmission of the sequence that includes the identified data unit or group. The identification parameters may be input to the integrated circuit through register read and write operations to the integrated circuit. In another implementation of the present invention, the data content of a data unit or group used to generate a valid data verification parameter may be altered so the data unit or group no longer corresponds to the data verification parameters.

These and other advantages and features of the present invention may be discerned from reviewing the accompanying drawings and the detailed description of the invention.

BRIEF DESCRIPTION OF THE DRAWINGS

The present invention may take form in various circuit and method components and arrangement of circuit and method components. The drawings are only for purposes of illustrating an exemplary embodiment and are not to be construed as limiting the invention.

DETAILED DESCRIPTION OF THE INVENTION

Figure 1:
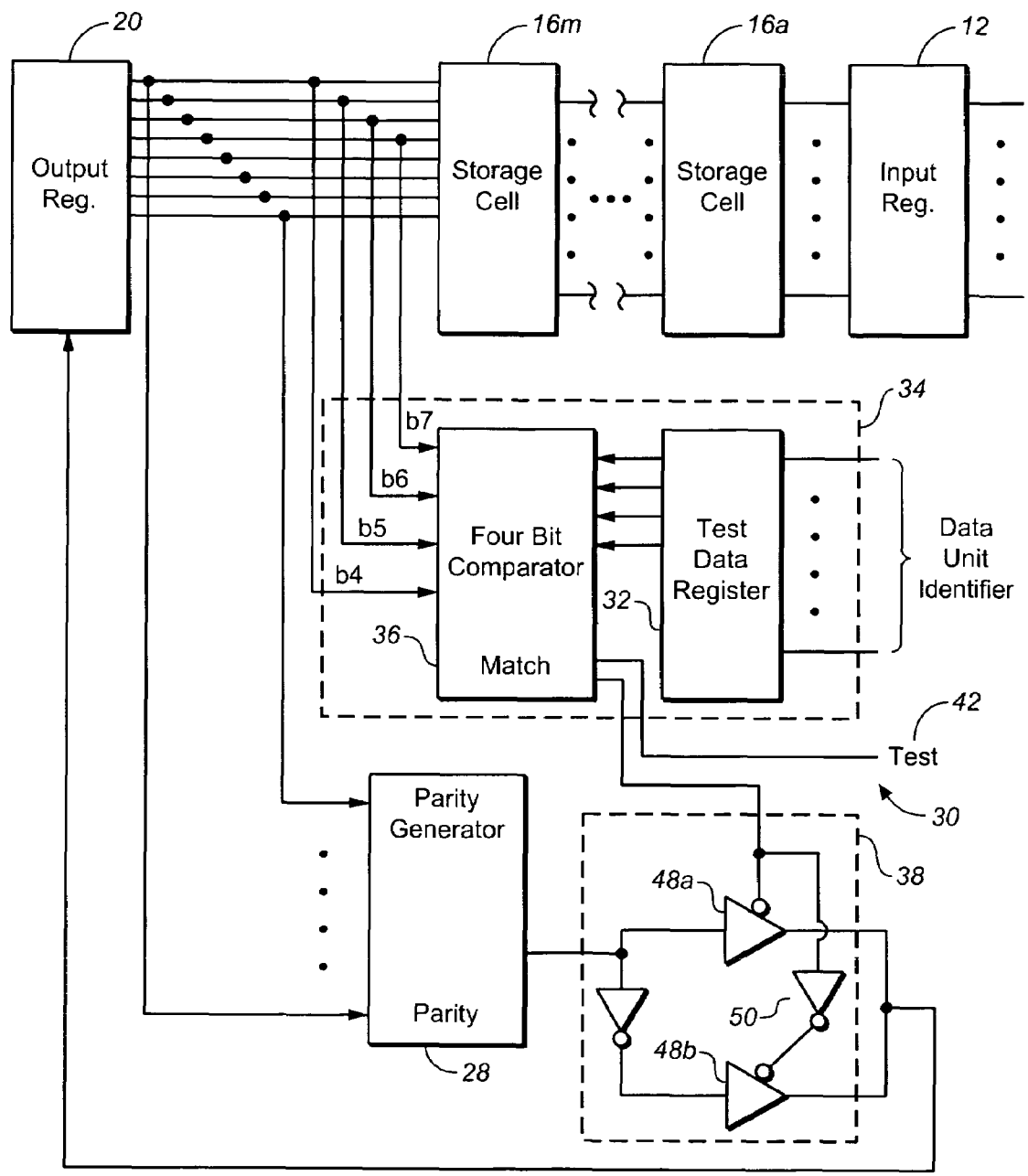
FIG. 1 is a block diagram of a portion of an integrated circuit and test circuitry that uses data unit content to generate erroneous data verification parameters for real-time testing.

FIG. 1 depicts a portion of the circuitry of an integrated circuit that may be used to implement a first-in, first-out (FIFO) memory device. Data units, such as data bytes or words, may be input to the device through input register 12. Data units may be of any width and are depicted as being n bits wide in FIG. 1. A data unit stored in input register 12 is transferred to the next available storage cell 16a–16m. When all of the m storage cells 16a–16m contain a data unit, a FIFO full signal is typically asserted to reduce the likelihood of data being erroneously overwritten. The last storage cell in the array, 16m, is coupled to an output register 20 from which a data unit may be read. Asserting a read signal causes each data storage cell 16a–16m to transfer its data contents to the next storage cell and the contents of storage cell 16m are transferred to output register 20. In parallel, parity generator 28 uses the data contents of cell 16m to generate a bit of information indicating even or odd parity. Typically, a '1' bit represents odd parity and a '0' bit represents even parity. The parity bit is also transferred to output register 20 so its contents are comprised of the data from storage cell 16m and the parity bit. The contents of output register 20 are asserted so the device that activated the read signal may read them.

Exemplary test circuitry 30 that supports real-time testing of exception data processing is also shown in FIG. 1. Test circuitry 30 includes a data unit identifier 34 and a data verification parameter generator 38. In the example shown in FIG. 1, data content that may be used to identify a data unit may be stored in data unit identifier 34. This data content is compared to data content being transferred to output register 20 when test signal 42 is asserted. In the example of FIG. 1, identifier 34 includes a four bit comparator 36 that is enabled by activation of test signal 42. The signal generated by comparator 36 that indicates the four bits of data being transferred to output register 20 are the same as the four bits of the data content is also used to select one of two output buffer drivers 48a,b. Inverter 50 ensures that driver 48a and 48b are not active at the same time. As long as buffer 48a is enabled, the parity bit produced by parity generator 28 is output to register 20 along with the data content transferred from storage cell 16m. In exemplary test circuitry 30, an indication from data unit identifier 34 that the data unit content in test data register 32 corresponds to the data unit content being transferred to output register 20 causes buffer 48a to be disabled and buffer 48b to be enabled. The input of buffer 48b is coupled to the inverted output of parity generator 28. Thus, register 20 receives through buffer 48b an erroneous data verification parameter for inclusion with the data content of storage cell 16m.

Figure 1A:
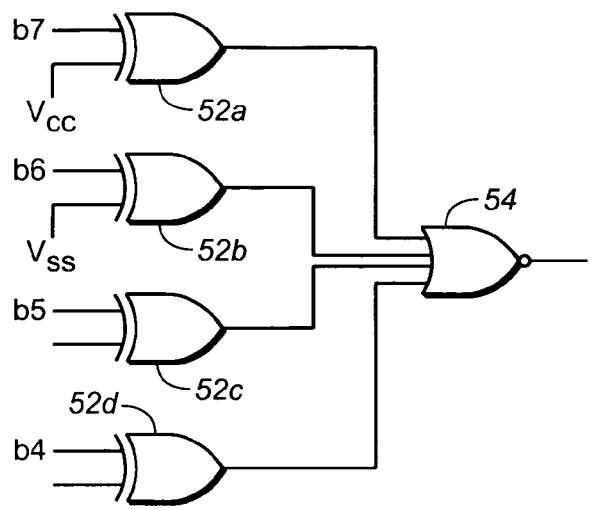
FIG. 1a is a depiction of logical components that may be used to provide a data identifier that is an alternative to the comparator shown in FIG. 1.

In the exemplary circuit of FIG. 1, a four bit comparator is used but other data widths could be compared. For example, if all eight bits were compared, a data unit would be identified by its entire data content. To reduce components for implementation of test circuitry 30, comparator 36 could be eliminated and replaced with logic gates having an input tied to predefined values to generate the enable signal for drivers 48a, b. For example, FIG. 1a shows four XOR gates 52a–d with each having an input tied to a logic high or low. The outputs of these gates are provided to a NOR gate 54. When the upper nibble of a data unit being transferred to output register 20 has a 'B' hexadecimal value, the output of gate 54 disables driver 48a and enables driver 48b. In these various exemplary circuits, comparator 36 supports flexibility in defining the data content that identifies a data unit while the gates of FIG. 1a are simpler to implement on an integrated circuit substrate.

Other variations of the exemplary circuitry may also be used to achieve the same results. For example, rather than inverting the parity bit, test circuitry 30 may invert one of the data bits being transferred to output register 20. As all of the non-inverted data bits are provided to parity generator 28, the data verification parameter produced by generators 28 and 38 for the identified data unit do not agree with the data unit having the inverted bit stored in register 20. Thus, this data unit and its corresponding data verification parameter may be used to test exception data processing of a data receiver. In an implementation of a FIFO or other storage device that stores a parity bit or other data verification parameter with the data content, an erroneous data verification parameter may be generated and stored with the data content. For example, test circuitry 30 may be constructed to generate and store an erroneous parity bit in a storage cell or to alter one of the data content bits stored in a cell.

Figure 2:
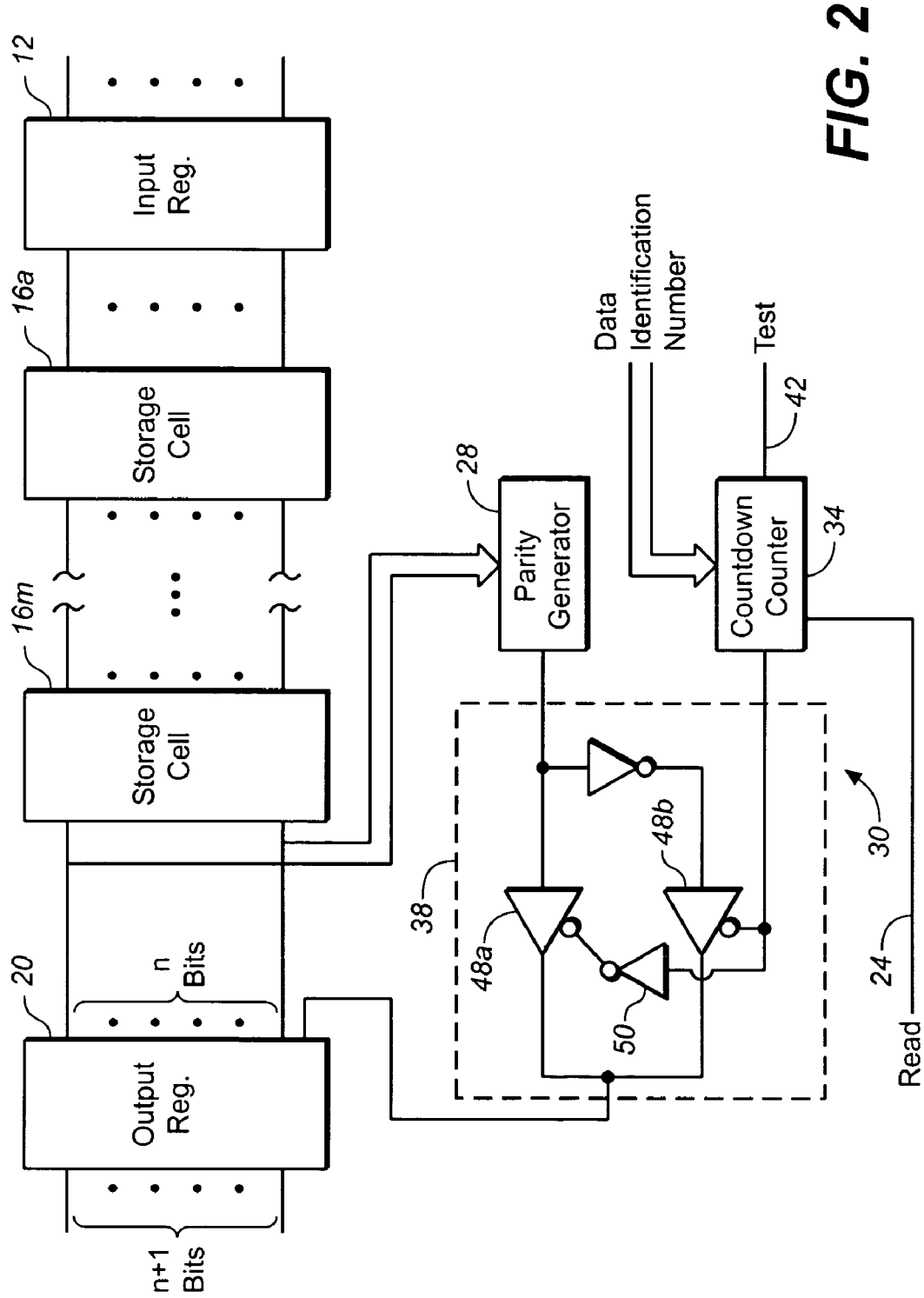
FIG. 2 is a block diagram of a portion of an integrated circuit and test circuitry that uses data unit position identifiers to generate erroneous data verification parameters for real-time testing.

Using the same numerals for similar components, FIG. 2 depicts an exemplary test circuit 30 for an integrated circuit that uses position of a data unit in a data sequence to identify the data unit. Again, data units, such as data bytes or words, may be input to the device through input register 12. A data unit stored in input register 12 is transferred to the next available storage cell 16a–16m. When all of the m storage cells 16a–16m contain a data unit, a FIFO full signal is typically asserted to reduce the likelihood of data being erroneously overwritten. Data may be read from the integrated circuit through output register 20 in response to a read signal 24 as discussed above. Parity is used as the data verification parameter and is provided by parity generator 28 which uses the data contents of cell 16m to generate a bit of information indicating even or odd parity. The parity bit is also transferred to output register 20 so its contents are comprised of the data from storage cell 16m and the parity bit. The contents of output register 20 are asserted so the device that activated read signal 24 may read them.

The exemplary test circuitry 30 shown in FIG. 2 also supports real-time testing of exception data processing. Test circuitry 30 includes a data unit identifier 34 and a data verification parameter generator 38. In the example shown in FIG. 2, a data unit identification number may be stored in data unit identifier 34 when test signal 42 is asserted. In the example of FIG. 2, identifier 34 is a countdown counter into which the data unit identification number is loaded as the countdown parameter in response to activation of test signal 42. The event counted by unit identifier 34 in the example is read signal 24. The signal indicating a zero count has been reached is used to select one of two output buffer drivers 48a,b. Inverter 50 ensures that driver 48a and 48b are not active at the same time. As long as buffer 48a is enabled, the parity bit produced by parity generator 28 is output to register 20 along with the data content transferred from storage cell 16m. In exemplary test circuitry 30, an indication from data unit identifier 34 that the data unit corresponding to the data unit identification number has reached output register 20 causes buffer 48a to be disabled and buffer 48b to be enabled. The input of buffer 48b is coupled to the inverted output of parity generator 28. Thus, register 20 receives through buffer 48b an erroneous data verification parameter for inclusion with the data content of storage cell 16m.

Other variations of the exemplary circuitry may be used to achieve the same results. For example, rather than inverting the parity bit, test circuitry 30 may invert one of the data bits being transferred to output register 20. As all of the non-inverted data bits are provided to parity generator 28, the data verification parameter produced by generators 28 and 38 for the identified data unit do not agree with the data unit having the inverted bit stored in register 20. Thus, this data unit and its corresponding data verification parameter may be used to test exception data processing of a data receiver. In an implementation of a FIFO or other storage device that stores a parity bit or other data verification parameter with the data content, an erroneous data verification parameter may be generated and stored with the identified data unit. For example, test circuitry 30 may be constructed to generate and store an erroneous parity bit in a storage cell or to alter one of the data content bits stored in a cell.

In a similar manner, test circuitry may be included in a communication device to alter a data group verification parameter for a data message that occurs within a sequence of data messages. Alternatively, one or more data units within a message may be altered after a data group verification parameter is generated so a data exception may be presented to a data receiver.

Figure 3:
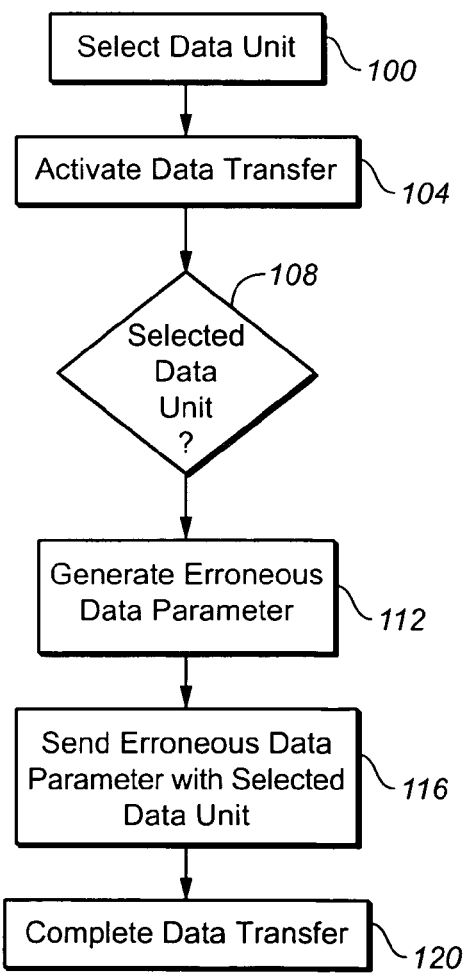
FIG. 3 is a depiction of a method for generating erroneous data verification parameters for real-time testing of a data receiver.

The method of the present invention is presented in FIG. 3. The method commences with the selection of a data unit or data group for introduction of a data verification parameter error (Block 100). A data transfer is activated that includes the selected data unit or group (Block 104). The data unit or group may be selected or identified by its data content, either in whole or in part, or by its position in a data sequence. When the selected data unit or group is detected as being ready for transfer (Block 108), an erroneous data verification parameter is generated (Block 112) and sent with the selected data unit or group (Block 116). The data transfer then continues until completion (Block 120). As previously discussed, the erroneous data verification parameter may either be an alteration of a correct data verification parameter or an alteration of the data used to generate a data verification parameter. This method may be implemented in the exemplary test circuitry discussed above, an equivalent circuit, or in firmware for a processor implemented on an integrated circuit.

While the present invention has been illustrated by the description of exemplary processes, and while the various processes have been described in considerable detail, it is not the intention of the applicant to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A test circuit for inclusion on an integrated circuit comprising:
   a data unit identifier for identifying a data unit other than a next data unit to be transferred in a data unit sequence; and
   an erroneous data verification parameter generator for generating an erroneous data verification parameter corresponding to said data unit identified by said data unit identifier, said corresponding erroneous data verification parameter signifying non-verification of data content of said identified data unit.

2. The test circuit of claim 1, wherein said erroneous data verification parameter generator inverts a data verification parameter generated from said data content of said selected data unit.

3. The test circuit of claim 1, wherein said erroneous data verification parameter generator inverts a portion of said data content of said selected data unit that is used to generate a data verification parameter.

4. The test circuit of claim 1, wherein said data unit identifier identifies a data group and said erroneous data verification parameter corresponds to said identified data group.

5. The test circuit of claim 1, wherein said data unit identifier uses data unit content to identify said data unit.

6. The test circuit of claim 1, wherein said data unit identifier uses data unit position to identify said data unit.

7. A method for real-time testing of a data receiver with data transmitted from an integrated circuit comprising:
   identifying a data unit other than a next data unit to be transferred in a data sequence; and generating an erroneous data verification parameter signifying non-verification of data content of said identified data unit.

8. The method of claim 7, wherein said generation of said erroneous data verification parameter includes inversion of a data verification parameter generated from said data content of said selected data unit.

9. The method of claim 7, wherein said generation of said erroneous data verification parameter includes inversion of a portion of said data content of said selected data unit that is used to generate a data verification parameter.

10. The method of claim 7, wherein said identification identifies a data group and said generated erroneous data verification parameter corresponds to said identified data group.

11. The method of claim 7, wherein said identification identifies a data unit using data unit content of said data unit.

12. The method of claim 7, wherein said identification identifies a data unit using position of said data unit in a data sequence.

* * * * *